Patented Dec. 3, 1946

2,411,992

UNITED STATES PATENT OFFICE 2,411,992

ALKYLATION OF PARAFFIN HYDROCARBONS

Aristid V. Grosse, Bronxville, N. Y., and Carl B. Linn, Chicago, Ill., assignors to Universal Oil Products Company, Chicago, Ill., a corporation of Delaware No Drawing. Application May 18, 1942, Serial No. 443,490

6 Claims. (Cl. 260—683.4)

This is a continuation-in-part of our co-pending application Seral No. 299,108, filed October 12, 1939.

This invention is concerned with the interaction of isoparaffinic hydrocarbons with ethylene in the presence of catalysts. It is more specifically concerned with a simple and easily regulated process involving the use of mixtures of normally liquid and normally gaseous compounds of fluorine which catalyze the desired conversion with a h'gh degree of efficiency and undergo substantially no alteration in the course of the reactions.

Processes for the formation of higher molecular weight isoparaffinic hydrocarbons from isobutane, isopentane, and other alkylatable paraffinic hydrocarbons, all herein included by the term "isoparaffins," are important from the standpoint of the motor fuel industry which demands increasing quantities of isoparaffins boiling in the range of gasoline motor fuel.

In one specific embodiment the present invention comprises a process for synthesizing paraffinc hydrocarbons by reacting an isoparaffinic hydrocarbon with ethylene under alkylating conditions in the presence of hydrogen fluoride and boron fluoride.

Considerable quantities of butanes and lighter gases containing ethylene are available as by-products from the cracking of petroleum fractions to produce relatively high primary yields of gasoline, and by segregation of butanes and ethylene by relatively simple fractional distillation methods, cuts are available for recombination to produce substantial yields of isomeric hexanes and higher boiling isoparaffins of good octane number. Isoparaffins boiling higher than hexanes may be formed by alkylation of isomeric hexanes by further quantities of ethylene in the presence of the alkylation catalyst.

Catalysts previously utilized in the alkylation of isoparaffinic hydrocarbons with olefinic hydrocarbons include sulfuric acid, phosphoric acid, and aluminum chloride, all of which have disadvantages which are, in a large measure, overcome by the use of the mixed boron fluoride-hydrogen fluoride catalyst of the present invention. Sulfuric acid, for example, has a tendency to oxidize hydrocarbons with the formation of sulfur dioxide. Phosphoric acid can be utilized as catalyst for the alkylation of isoparaffinic hydrocarbons but the reaction is not accelerated to a practical degree unless high temperatures and pressures are employed. Aluminum chloride and similar metal halides which are generally employed in the presence of hydrogen chloride or hydrogen bromide have the usual disadvantages inherent to the use of solid granular catalysts in that the efficiency of the reaction is to some extent dependent upon the fineness of the subdivision of the catalyst, the efficiency of stirring or mixing of the reaction mixture, etc. The recovery of aluminum chloride or other metal halides from the reaction products in suitable form for recycling is difficult and expensive whereas the present catalyst mixture of boron fluoride and hydrogen fluoride is readily separable in a form which can be recycled to further use in the alkylation reaction.

Thus considerable difficulties have been encountered previously in attempting to alkylate isoparaffinic hydrocarbons with ethylene in the presence of such catalysts as sulfuric acid or hydrogen fluoride of about 90 to about 100% concentration, but we find that the reaction between ethylene and an isoparaffin such as isobutane, isopentane, isohexane, etc., or between ethylene and isoparaffin-normal paraffin mixtures may be carried out readily in the presence of a mixture of boron fluoride and hydrogen fluoride to give a relatively high yield of substantially saturated hydrocarbons comprising essentially branched chain hexanes, heptanes, octanes, and higher boiling isoparaffins. The catalyst utilized in the present invention is formed by mixing boron fluoride with hydrogen fluoride. The former is a gas at normal temperatures and boils at $-101°$ C. under atmospheric pressure while substantially anhydrous hydrogen fluoride is a liquid boiling at about $20°$ C. under an absolute pressure of 1 atmosphere. A mixture of boron fluoride and hydrogen fluoride can be used as alkylating catalyst in apparatus which has been cooled to maintain a temperature slightly below the boiling point of hydrogen fluoride and low enough to keep in liquid state a substantial proportion of the catalyst, or the catalyst mixture can be used at higher temperatures if sufficient pressure is kept upon the apparatus. By maintaining an excess of isoparaffins to olefins at all times, polymerization reactions and the formation of ethyl fluoride are kept relatively low so that the products consist principally of alkylated derivatives of the original isoparaffin hydrocarbon.

The process of the present invention may be carried out utilizing either batch or continuous type operations. In batch type operation the preferred procedure is to agitate a mixture of hydrogen fluoride, boron fluoride, and an isoparaffin and to introduce gradually thereto ethylene, an ethylene-ethane fraction, a mixture of ethylene and an isoparaffin, or a mixture of a normal paraffin, an isoparaffin and ethylene. After a time of mixing sufficient to effect substantially complete reaction of the ethylene with the isoparaffin, the latter being present in excess of the olefin at all times, the agitation is stopped and the reaction mixture is separated into catalyst, unconverted isoparaffin, and alkylation product, after which the excess isoparaffin and used catalyst may be utilized in a subsequent alkylation treatment.

The process may be made continuous by providing a mixing zone through which the reacting hydrocarbons and catalyst are passed and in which sufficient time is given for the completion of the desired alkylation. The products from such a reaction zone are then directed to a separating zone in which the desired alkylation products are separated from unconverted isoparaffins and catalyst components. The recovered unconverted isoparaffins and catalyst are then recycled to further contact with the isoparaffins and ethylene being charged to the process.

The activity of a boron fluoride-hydrogen fluoride catalyst is dependent upon the relative proportions of these materials forming the catalyst mixture. The different catalytic composites which may be utilized are not necessarily equivalent in their action particularly when different isoparaffins are alkiated by ethylene. While alkylation reactions occur at temperatures of from about $-30°$ to about $100°$ C., the use of a temperature of between about $0°$ and about $50°$ C. is preferred. Pressures utilizable may vary from substantially atmospheric to approximately 50 atmospheres or more. In order to obtain high yields of alkylation product with substantially no formation of olefin polymers, it is desirable to maintain a molar excess of isoparaffin to olefin throughout the entire reaction. Generally up to about 25 molar proportions of isoparaffins are present per molecular proportion of olefin introduced to alkylation. The amount of olefin polymerization is thus not only kept low but the formation of ethyl fluoride is also kept low so that the reaction product consists principally of alkylated derivatives of the original isoparaffin containing relatively small amounts of ethyl fluoride.

The following example shows results obtained when utilizing the present process for alkylating an isoparaffinic hydrocarbons with ethylene although the example given should not be construed to impose undue limitations upon the generally broad scope of the invention.

100 parts by weight of hydrogen fluoride, 10 parts by weight of boron fluoride, and 300 parts by weight of isobutane were charged to an autoclave provided with a mechanically driven stirrer which was operated while ethylene was introduced at $20°$ C. to a total pressure of 36 atmospheres. The stirring at $20°$ C. was continued for about 12 hours after which the reaction mixture was removed from the autoclave and separated into unconverted isobutane, hydrogen fluoride-boron fluoride catalyst, and about 200 parts by weight of an alkylation product consisting of substantially saturated hydrocarbons containing 90% by volume of gasoline with an end boiling-point of $205°$ C. The gasoline fraction contained about 55% by volume of branched chain hexanes.

The foregoing specification and example indicate the character and practical value of the present invention, although it is not intended that either section should impose undue limitations thereon.

We claim as our invention:

1. A process for the production of normally liquid saturated hydrocarbons which comprises reacting an isoparaffin with an olefin under alkylating conditions in the presence of an alkylation catalyst consisting essentially of a major proportion of hydrogen fluoride and a minor proportion of boron fluoride.

2. A process for the production of normally liquid saturated hydrocarbons which comprises reacting an isoparaffin with ethylene under alkylating conditions in the presence of an alkylation catalyst consisting essentially of a major proportion of hydrogen fluoride and a minor proportion of boron fluoride.

3. A process for synthesizing hydrocarbons which comprises reacting an isoparaffin with an olefin under alkylation conditions in the presence of a metal-free alkylating catalyst predominating in hydrogen fluoride and containing a minor proportion of boron fluoride.

4. A process for synthesizing hydrocarbons which comprises reacting an isoparaffin with ethylene under alkylation conditions in the presence of a metal-free alkylating catalyst predominating in hydrogen fluoride and containing a minor proportion of boron fluoride.

5. A process for the production of normally liquid saturated hydrocarbons which comprises reacting an alkylatable paraffin with an olefin under alkylating conditions in the presence of an alkylation catalyst consisting essentially of a major proportion of hydrogen fluoride and a minor proportion of boron fluoride.

6. A process for synthesizing hydrocarbons which comprises reacting an alkylatable paraffin with an olefin under alkylation conditions in the presence of a metal-free alkylating catalyst predominating in hydrogen fluoride and containing a minor proportion of boron fluoride.

ARISTID V. GROSSE.
CARL B. LINN.